United States Patent
McKnatt et al.

(10) Patent No.: US 12,317,956 B2
(45) Date of Patent: Jun. 3, 2025

(54) SLIP RESISTANT SHOE COVER

(71) Applicant: UA Thomas Co. Ltd., Chachoengsao (TH)

(72) Inventors: Thomas M. McKnatt, Surathani (TH); Buncha Tomogol, Bangkok (TH); Noppadol Polbundit, Bangkok (TH); Dave Narasimhan, Flemington, NJ (US); Sudarshan Narasimhan, Flemington, NJ (US)

(73) Assignee: UA Thomas Co. Ltd., Chachoengsao (TH)

( * ) Notice: Subject to any disclaimer, the term of this patent is extended or adjusted under 35 U.S.C. 154(b) by 1009 days.

(21) Appl. No.: 16/862,526

(22) Filed: Apr. 29, 2020

(65) Prior Publication Data
US 2021/0337930 A1     Nov. 4, 2021

(51) Int. Cl.
*A43B 23/02*     (2006.01)
*B29C 41/00*     (2006.01)
(Continued)

(52) U.S. Cl.
CPC ........ *A43B 23/0215* (2013.01); *B29C 41/003* (2013.01); *B29C 41/14* (2013.01);
(Continued)

(58) Field of Classification Search
CPC ............. Y10T 428/13; Y10T 428/1352; Y10T 428/1386; Y10T 428/24479;
(Continued)

(56) References Cited

U.S. PATENT DOCUMENTS

| 4,695,609 A | 9/1987 | Stevenson |
| 5,254,635 A | 10/1993 | Stevenson et al. |

(Continued)

FOREIGN PATENT DOCUMENTS

| DE | 102010000676 A1 * | 7/2011 | ......... A41D 19/0058 |
| ES | 2408787 A1 * | 6/2013 | ........... G01N 24/085 |
| GB | 2436566 A | 3/2007 | |

OTHER PUBLICATIONS

Machine translation (Espacenet) of DE 10 2010 000 676 A1. Translated May 20, 2023. (Year: 2023).*
(Continued)

*Primary Examiner* — Maria V Ewald
*Assistant Examiner* — Ethan A. Utt
(74) *Attorney, Agent, or Firm* — Tatonetti IP

(57) ABSTRACT

A shoe cover is a natural latex article with reduced amount of sulfur cross linking agent and accelerators including zinc dithiocarbamate that break catalytically soluble sulfur $S_8$ sulfur rings forming sulfur linear chains. Surfactants present in the pre-vulcanization composition wets natural polyisoprene particles and permeates small sized sulfur into the interior of these particles thereby pre-vulcanizing the particles. The latex emulsion also has post-vulcanization composition with accelerators that crosslink between particles during the post vulcanization cure cycle. The dipped natural polyisoprene article is substantially uniformly cured both in the inter-particle and intra-particle regions and reliably exhibits high cross link density, uniform distribution of double bonds and zinc segregation at the boundaries or original particles. The natural rubber films exhibit high tensile strength, tensile modulus, tear strength, elongation with low modulus of the shoe cover. The bottom surface of the shoe cover is etched to produce a slip resistant surface.

14 Claims, 5 Drawing Sheets

(51) Int. Cl.
| | |
|---|---|
| *B29C 41/14* | (2006.01) |
| *B29C 41/22* | (2006.01) |
| *B29C 41/34* | (2006.01) |
| *B29K 105/00* | (2006.01) |
| *B29L 31/50* | (2006.01) |
| *B32B 3/30* | (2006.01) |
| *B32B 25/04* | (2006.01) |
| *B32B 25/12* | (2006.01) |
| *C08J 3/24* | (2006.01) |
| *C08J 5/02* | (2006.01) |
| *C08L 7/02* | (2006.01) |

(52) U.S. Cl.
CPC .............. *B29C 41/22* (2013.01); *B29C 41/34* (2013.01); *B32B 3/30* (2013.01); *B32B 25/042* (2013.01); *B32B 25/12* (2013.01); *C08J 3/244* (2013.01); *C08J 5/02* (2013.01); *C08L 7/02* (2013.01); *B29K 2105/0064* (2013.01); *B29L 2031/50* (2013.01); *B32B 2250/02* (2013.01); *B32B 2250/248* (2013.01); *B32B 2307/51* (2013.01); *B32B 2307/744* (2013.01); *B32B 2437/02* (2013.01); *C08L 2201/52* (2013.01); *C08L 2312/00* (2013.01)

(58) Field of Classification Search
CPC ..... Y10T 428/24521; Y10T 428/24537; Y10T 428/24554; Y10T 428/2457; Y10T 428/24612; Y10T 428/2462; Y10T 428/24942; Y10T 428/2495; Y10T 428/24967; Y10T 428/24975; Y10T 428/26; Y10T 428/266; Y10T 428/269; Y10T 428/31; Y10T 428/31826; Y10T 428/3183; B32B 1/00; B32B 3/00; B32B 3/26; B32B 3/263; B32B 3/30; B32B 25/04; B32B 25/00; B32B 25/042; B32B 25/12; B32B 33/00; B32B 2307/70; B32B 2307/73; B32B 2437/00; B32B 2437/02; A43B 1/00; A43B 1/009; A43B 1/10; A43B 3/16; A43B 3/163

USPC ....... 428/156, 161, 163, 165, 167, 172, 173, 428/212, 213, 215, 216, 220, 332, 337, 428/339, 409, 492, 493, 34.1, 35.7, 36.8; 2/455, 22, 46, 243.1; 36/7.1 R, 7.3, 4
See application file for complete search history.

(56) References Cited

U.S. PATENT DOCUMENTS

| | | | |
|---|---|---|---|
| 5,744,552 | A | 4/1998 | D'Sidocky et al. |
| 6,114,469 | A | 9/2000 | Rauchfuss et al. |
| 6,221,447 | B1 | 4/2001 | Munn et al. |
| 6,391,326 | B1 | 5/2002 | Crepeau et al. |
| 6,618,861 | B2 | 9/2003 | Saks et al. |
| 6,653,380 | B2 | 11/2003 | Dzikowicz |
| 6,828,387 | B2 | 12/2004 | Wang et al. |
| 7,041,746 | B2 | 5/2006 | Dzikowicz |
| 7,048,977 | B2 | 5/2006 | Dzikowicz |
| 2002/0173563 | A1 | 11/2002 | Wang et al. |
| 2010/0115795 | A1* | 5/2010 | Stead ................ A43B 3/26 36/102 |
| 2014/0157832 | A1* | 6/2014 | Thompson ........... D04B 1/28 66/65 |
| 2014/0196320 | A1 | 7/2014 | Larson et al. |
| 2015/0128329 | A1* | 5/2015 | Amarasekera ..... A41D 19/0055 2/167 |
| 2016/0174629 | A1* | 6/2016 | Mata ................. A41B 11/004 2/455 |
| 2019/0053575 | A1 | 2/2019 | Austin |
| 2019/0062471 | A1* | 2/2019 | Nguyen ............... C08F 36/08 |

OTHER PUBLICATIONS

Machine translation (Espacenet) of ES 2,408,787 A1. Translated Sep. 6, 2024. (Year: 2024).*

K.K. Sasidharan, Rani Joseph, Shiny Palaty, K.S. Gopalakrishnan, G. Rajammal, P. Viswanatha Pillai, "Effect of the Vulcanization Time and Storage on the Stability and Physical Properties of Sulfur-Prevulcanized Natural Rubber Latex", Wiley InterScience, Dec. 13, 2004, pp. 1804-1811, India.

* cited by examiner

From USPS 6,673,871

Dipping Process Flowchart For Shoe Cover

SLIP RESISTANT SHOE COVER

FIELD OF THE INVENTION

The invention relates to producing natural latex shoe cover with enhanced traction and method therefore with an improved inter particle and intra particle bond using controlled pre-vulcanized particles of natural latex that is dip formed into a thin latex article from an aqueous latex emulsion. The shoe cover made from natural rubber having a sole which has slip resistant fine structure that is produced by etching and is further covered by acrylic coating which prevents rapid wear of sole. The overshoe incorporates a highly stretchable natural rubber body that can be easily donned over a regular attractive shoe preventing the exposure of the attractive shoe to wetness and muck. The natural latex used for molding the overshoe body has reduced amount of sulfur and other accelerator cross linking agents and is vulcanized at a reduced temperature of only to 110° C. to 130° C. providing elongation of about 800%.

BACKGROUND OF THE INVENTION

Natural latex shoe cover is typically made from vulcanized natural rubber due to its low cost and easy manufacturability. Natural rubber is produced in latex form by the *Hevea brasiliensis* tree and has unique characteristics. These characteristics make natural rubber particularly useful for the preparation of barrier protection products. Among the unique characteristics of natural rubber is its high level of stereo-regularity, meaning that the polymer of which it is comprised is a chain consisting almost exclusively of cis-1,4 isoprene units. Natural rubber latex is also a highly branched polymer with a high molecular weight and a wide molecular weight distribution. These characteristics of the base latex result in vulcanized rubber film products having a unique combination of strength and elasticity. However, natural polyisoprene also contains proteins that have been shown to produce dermal allergic reaction in some susceptible individuals.

In dip molding processes, the majority of work with natural polyisoprene has been focused on the development of polyisoprene gloves, using a coagulation dip process. In this type of process, a glove-shaped mold is first dipped into a solution that is known to destabilize the latex formulation. This coagulant layer is then dried, before the mold is dipped into a bath of a compounded latex formulation. The coagulated wet latex gel is typically leached in water to remove residual surfactant before being dried at a relatively high temperature to complete the cross-linking of the rubber film.

The use of vulcanizing or sulfur cross-linking agents in the manufacture of rubber articles is well-known. The effectiveness of sulfur crosslinking agent is improved by conventional accelerators including dithiocarbamate, thiazoles, guanidines, thioureas, amines, disulfides, thiurams, xanthates and sulfonamides. The use of vulcanizing agents in the manufacture of polyisoprene rubber is disclosed in D'Sidocky et al., U.S. Pat. No. 5,744,552, and Rauchfuss et al., U.S. Pat. No. 6,114,469.

U.S. Pat. No. 4,695,609 to Stevenson discloses vulcanizable rubber compositions containing less than 0.4 parts by weight of nitrosatable materials per 100 parts by weight rubber of xanthogen polysulfide and xanthate compounds. This rubber composition contains a dihydrocarbyl xanthogen polysulphide and a xanthate selected from metal hydrocarbylxanthates and dihydrocarbylxanthates. The aqueous latex emulsion item #9E contains sulfur, zinc oxide and zinc diethyldithiocarbamate, is stable for only four days, has a tensile strength at fracture is only 22.4 MPa, and an elongation of 830%.

U.S. Pat. No. 5,254,635 to Stevenson discloses a rubber composition containing dibenzylthiuram sulfide. A dibenzylthiuram sulfide, such as tetrabenzylthiuram disulphide, is combined with a dihydrocarbyl xanthogen polysulphide and/or a xanthate to provide a composition, which crosslinks natural rubber at 120-180° C. without providing harmful nitrosatables. This natural latex composition, however, is sulfur-free and does not crosslink intra particle regions of a synthetic cis-1,4-polyisoprene having low levels of stereo-regularity. Therefore, the use of these cross-linking agents for natural polyisoprene latex will result in a non-uniform article with inferior properties.

U.S. Pat. No. 6,221,447 to Munn et al. discloses rubber products that shrink due to the application of energy and hypo-allergenic rubbery products. This patent describes the preparation of hypo-allergenic rubber products, which shrink from a second shape and size to their original shape and size on application of heat. The examples include a polyisoprene article, which will shrink to fit the individual user during use. The curing package used to make this article consists of agents such as peroxides and/or sulfur.

U.S. Pat. No. 6,391,326 to Crepeau et al. discloses stable emulsions, methods of preparation, and applications, such as in the formation of elastomeric films. The stable emulsions for preparing an elastomeric film comprise (1) a phase A containing an elastomer dissolved in an organic nonpolar or slightly polar solvent, in which is dispersed (2) a phase B containing a polymer in solution or dispersed in a polar solvent, which is immiscible with phase A, and (3) a dispersing agent selected from the group consisting of block and grafted polymers. Droplets of phase B having a diameter of 10μ form in phase A. Crepeau et al. does not teach or suggest methods of stabilizing a polyisoprene aqueous latex emulsion against 'flock' formation.

U.S. Pat. No. 6,618,861 concerns a polyisoprene latex compound that includes an accelerator system of 2.0 parts per hundred ("phr") tetramethylthiuram disulfide ("TMTD"), 0.2 phr zinc 2-mercaptobenzothiazole ("ZMBT"), 0.2 phr zinc dibutyldithiocarbamate ("ZDBC"), 0.2 phr 1,3-diphenyl-2-thiourea and 0.2 phr zinc diethyldithiocarbamate ("ZDEC"). However, after curing, this accelerator system provides tensile strength only of about 1,900 psi.

U.S. Pat. Nos. 6,653,380 and 7,048,977 to Dzikowicz disclose Latex film compound with improved tear resistance. The method of enhances the tear resistance, tensile strength, and the aging properties of a latex product by adding an antioxidant synergist with an antioxidant to a latex compound. The latex compound comprises a polymer, a stabilizing system, a film surface conditioner and a curing system that comprises an activator, crosslinker and accelerator. Antioxidant synergists include 2-mercaptobenzimidazole (MBI), 2-mercaptotoluimidazole (MTI), zinc 2-mercaptobenzimidazole (ZMBI) and zinc 2-mercaptotoluimidazole (ZMTI). The latex products formed may be gloves but can also include threads, balloons and other latex-related products. The latex used with the addition of anti-oxidants does not pre-vulcanize the polyisoprene latex.

U.S. Pat. No. 6,828,387 to Wang et al. discloses polyisoprene articles and a process for making the same. This process produces polyisoprene articles exhibiting tensile strength properties similar to those of solvent-based processes using natural rubber latex. The process combines a synthetic latex with sulfur, zinc oxide and an accelerator composition comprising a dithiocarbamate, a thiazole, and a guanidine compound, all three of which need to be present, at the pre-cure stage. In a preferred embodiment, the accelerator composition comprises zinc diethyldithiocarbamate (ZDEC), zinc 2-mercaptobenzothiazole (ZMBT), and diphenyl guanidine (DPG), in conjunction with a stabilizer, which is primarily milk protein salt, such as sodium caseinate. Polyisoprene latex (typically 60% solids) and the stabilizer (e.g., sodium caseinate) are combined at ambient temperature (about 20-25° C.). After mixing for a period of time, the mixture is then diluted to 40% solids in water. Wingstay L is then added, and the mixture is stirred for approximately 15 min. At this point, the pH can be adjusted to a range of about 8.5 to 9.0. Zinc oxide is added, followed by the sulfur and accelerator compounds. The elastomeric polyisoprene product made by the process is a surgeon's glove dipped over a coagulant-coated former. The aqueous latex emulsion is only minimally stable with a maximum stability of eight days. The tensile strength of the surgical glove product obtained is approximately only 3,000 psi or 20.6 MPa. The accelerators are added to the latex emulsion, but maintained at a low temperature for up to eight days. The stability of this aqueous latex composition is better than that of Stevenson (U.S. Pat. No. 4,695,609), but is still inadequate for a manufacturing process.

U.S. Pat. No. 7,041,746 to Dzikowicz discloses accelerator system for synthetic polyisoprene latex. This accelerator system comprises dithiocarbamate and thiourea and can produce synthetic polyisoprene films having a tensile strength of about 3,000 psi to about 5,000 psi at low curing temperatures. These accelerators are not indicated to prevulcanize the polyisoprene particles and the latex article produced has a very low modulus of 1.5 MPa at 300% elongation and a tensile strength of 20.6 to 34.4 MPa.

U.S. patent application Ser. No. 2002/0173563A1 describes a process for making dipped articles from latex involving the use of an accelerator system comprising zinc diethyldithiocarbamate ("ZDEC"), zinc 2-mercaptobenzothiazole ("ZMBT"), and diphenyl guanidine ("DPG"). ZDEC with the ZMBT is a popular accelerator system for natural rubber latex. Only the addition of DPG allows this accelerator system to achieve cured films with tensile strengths in excess of 3,000 psi (20 MPa).

UK patent application GB 2,436,566 to Attrill et al. discloses minimizing pre-vulcanization of polyisoprene latex. This process for making a polyisoprene latex comprises compounding a synthetic polyisoprene latex with compounding ingredients and maturing the latex at a low temperature so as to minimize pre-vulcanization. Dipping of condoms is also conducted at low temperatures typically 15° C. to less than 20° C. The absence of pre-vulcanization is verified by assuring the strength of a ring made has a prevulcanisate relaxed modulus has a value less than 0.1 MPa indicative of the absence of pre-vulcanization. The latex emulsion may contain accelerator such as dithiocarbamate. The '566 patent application teaches away from pre-vulcanization prior to dipping of latex articles.

US Patent application no 20140196320 to Larson et al discloses Anti-Slip Overshoe with Flexible Cleats and Method of Gripping Natural Surfaces. This anti-slip overshoe has a contoured outer band and first gripping pad and second gripping pad disposed interior to the contoured outer band for enhanced traction. A web structure connects the first gripping pad and second gripping pad to the contoured outer band. A plurality of gripping devices is attached to the first gripping pad and second gripping pad for enhanced traction on natural surfaces. The gripping devices includes a body, button extending from a first end of the body, plurality of spikes disposed around a perimeter of the body, and central spike extending from a second end of the body. A neck is disposed around the body between the button and spikes. The spikes include a traction arm, plurality of edges formed along the traction arm, and concave surface between a first edge and second edge along the traction arm. The anti slip elements have cleats and is not formed from a natural rubber shoe cover.

US Patent application no 20190053575 to Austin discloses Overshoe. A comfortable overshoe that can be worn over various types of footwear has a flexible, resilient sole and means for releasably attaching the overshoe to a boot or other footwear. The sole has a flexible, generally planar, medial wall, with a plurality of hollow domes formed in and extending from the top side of the medial wall. A plurality of triradial support members extend from the bottom of the medial wall and are spaced around the underside of each dome. When a person wearing the overshoes walks across a surface having numerous irregular features, certain domes and support members may be compressed, deflected, and/or undergo tension as the soles of the overshoes encounter the surface. This cushions the user's feet and provides a very comfortable walking experience. When an overshoe constructed as described herein encounters a hard object, such as a piece of gravel, the sole accommodates the object and either "absorbs" it or dampens the impact felt by the user, in a way that depends on the size of the object and the particular part(s) or region(s) of the sole that strike the object. These features are not formed using a natural rubber coating applied to the bottom of the overshoe.

There is a need, therefore, for a high elongation stretchable shoe cover made from dipping a former in a stable natural polyisoprene latex emulsion composition that does not agglomerate or flock providing usable emulsion lifetimes. The composition must achieve intra-particle and inter-particle crosslinking in the final product. Such a composition would enable the dip-forming of articles in the presence of a coagulant, such that articles having thinner, continuous, and defect-free layers with enhanced strength and improved stretchability could be obtained. Such articles would not deteriorate and would maintain their physical integrity over time. It is an object of the present invention to provide such a composition, as well as a method of preparing and using such a composition to dip-form slip resistant shoe covers, and the articles so produced. These and other objects and advantages, as well as additional inventive features, will become apparent from the detailed description provided herein.

SUMMARY OF THE INVENTION

The present invention provides a latex article that is cured by dipping a shoe shaped former in a pre-vulcanized natural latex emulsion with the use of calcium nitrate coagulant, and curing the shoe cover thus produced.

The invention relates to producing natural latex shoe cover with enhanced traction at the ground contacting portion of the shoe cover by means of a series of grooves and intervening ridges formed by an etching process. The etching includes an etching solution comprising a nonpolar solvent mixed with one or more polar solvents that dissolve the natural latex coating forming grooves in the shoe cover bottom surface. The nonpolar solvent is selected from toluene, benzene and other nonpolar solvents which form several parallel streams due to their immiscibility with polar solvents. While a number of nonpolar solvents are known, the density of the nonpolar solvent is an important factor in working with polar solvents to form discrete streams as detailed below. The shoe cover made from natural rubber having a sole which has slip resistant fine structure produced by etching and is further covered by acrylic coating which prevents rapid wear of sole. The overshoe incorporates a highly stretchable natural rubber body that can be easily donned over a regular attractive shoe preventing the exposure of the shoe to wetness and muck. The natural latex used for molding the overshoe body has reduced amount of sulfur and other accelerator cross linking agents and is vulcanized at a reduced temperature of only to 110° C. to 130° C. providing elongation of about 800%.

1. The shoe cover is made by immersing a narrow former that has a width of about 20% of the width of the shoe is first coated with a calcium nitrate coagulant coating, dried and then immersed into in a natural rubber latex at 22 to 25° C. that has sulfur only 3 to 4 percent of natural rubber weight (phr) with minimal use in of accelerators or cross linking agents with a total solid content of 50-55%. The elastic stretch of the shoe cover allows the expansion of the shoe cover from both sides of the shoe and the shoe cover captures the shoe worn by the user of about 3 MPa.
2. The former with natural rubber coating is next dipped only on the ground contacting foot portion of the shoe producing a thicker latex coating at the bottom of the shoe cover.
3. Next the bottom portion of the former with thicker second latex coating is immersed in a texturizing and etching tank to texturize the bottom sole of the shoe cover. The texturing tank has preferably toluene (92% by weight), ethyl alcohol (4% by weight) and acetic acid (4% by weight). Toluene is a non-polar solvent and does not interact or dissolve polar solvents such acetic acid, alcohol or water incorporated in the second latex coating. When these three ingredients are mixed in the etching tank, the polar solvents of ethyl alcohol and acetic acid form immiscible droplets forming a separate stream from the stream of the toluene, which is a nonpolar solvent. When the former with the second latex coating is immersed in gently flowing etching tank solution, it forms parallel flow patterns of non-polar toluene solvent and polar ethyl alcohol and acetic acid streams. The stream of parallel polar solvents dissolve the latex coating forming grooved lines while the stream of non-polar toluene forms ridges there between the grooves. At the same time, acetic acid in the polar solvent stream functions as a coagulant and coagulates and stabilize both the grooves and the ridge portions between the grooves even though the second latex layers are not yet cross linked. The etching action of the streams of the polar solvents occurs both in the grooves and the ridges. This natural latex rubber is cured later after the second latex dip and texturizing at a low temperature of about 110° C. to 130° C. in three adjacent heating stations that increases the temperature progressively thereby curing the natural rubber coating. The hardened latex film is highly stretchable, with an elongation of typically 800%.

The latex particles in the latex emulsion used in the process are pre-vulcanized by the incorporation of sulfur within the interstices of latex particles. This incorporation of sulfur within the natural latex particles is accomplished by 1) using a sulfur emulsion that has a high content of soluble sulfur with $S_8$ ring structure; 2) said ring structure is disrupted or broken by catalytic activity of zinc dithiocarbamate resulting in linear sulfur chains in the latex emulsion adapted for easy migration into the natural polyisoprene particles in the latex emulsion; 3) use of potassium caprylate surfactant and sodium dodecyl benzene sulphonate (SDBS) surfactant to wet the particles of polyisoprene in the latex emulsion there by chains of sulfur along with sulfur captured zinc dithiocarbamate is available for permeation into said particles; 4) allowing sufficient time at selected process temperature in the range of 20° C. to 30° C. to progressively permeate sulfur into said synthetic polyisoprene particles; 5) validating sulfur permeation and pre-vulcanization by chloroform index test wherein the polyisoprene particles are no longer tacky but is in the form of a dry crumbs with an chloroform index of 2.5-3.0. Zinc dithiocabamate is a zinc complex of dithiocarbamate and includes zinc dimethyldithiocarbamate, zinc diethyl dithiocarbamate, zinc dibutyldithiocarbamate. In addition, the natural polyisoprene latex emulsion has other crosslinking agents such as sodium dibutyldithiocarbamate (SDBC), tetrabenzyl thiuram disulfide, diisopropyl xanthogen, tetraethylthiuram disulfide, xanthogen sulfide for curing the inter-particle regions during the vulcanization or cure cycle. Insoluble sulfur such as amorphous sulfur or polysulfur present in the sulfur added to the latex emulsion becomes soluble at post-vulcanization cure temperature and reacts with zinc dithiocarbamate accelerator curing inter particle regions during post vulcanization cure pre-vulcanized natural polyisoprene particles with the permeated sulfur also cure completely. Therefore using this methodology of using a pre-vulcanization accelerator package and post vulcanization accelerator package a substantially uniform cured natural latex shoe cover film that is highly stretchable with an elongation up to 800% is produced.

The product thus produced has several distinguishing features that have imprints of this pre-vulcanization methodology. Since the natural polyisoprene thin film of latex is cured with improved crosslink density, the molecular weight between crosslinks exhibits a lower value. Since zinc complex of dithiocarbamate catalytically breaks the Ss ring of sulfur and as a catalyst, it is available for subsequent use and does not readily penetrate the natural polyisoprene due to its large molecular size. The molecular size of zinc dibutyldithiocarbamate is a larger than that of zinc diethyldithiocarbamate which has a molecular size greater than that of zinc dimethyldithiocarbamate. Zinc dibenzyldithiocarbamate and zinc diphenyldithiocarbamate are even larger molecules and will resist permeation into the natural polyisoprene latex particles. Thus the preferred zinc complex of dithiocarbamate for pre-vulcanization of natural latex particles in the latex emulsion is zinc dibutyldithiocarbamate (ZDBC) or zinc diethydithiocarbamate (ZDEC). There is an accumulation of zinc containing compounds surrounding each of the original natural polyisoprene particles, and this microstructural feature can be readily observed by microprobe elemental analysis using an electron microscope. The natural polyisoprene films produced typically have acceptable tensile strength, acceptable tensile modulus and elongation at fracture with the fracture front passing through both the inter particle and intra particle regions indicating that the intra particle regions and inter particle regions are substantially of equal strength within the natural latex films produced.

The method for producing natural polyisoprene shoe cover comprises use of a natural latex emulsion that is a pre-vulcanized composition. Preferably, the natural polyisoprene particles are cis-1,4-polyisoprene, have a diameter in the range of about 0.2 to 2 micrometers, and are maintained in an aqueous medium of the latex emulsion. The pre-vulcanized composition has sulfur with high soluble sulfur content, typically of the $S_8$ ring structure broken by zinc dithiocarbamate accelerator disrupting the $S_8$ sulfur ring structure. A combination of surfactants including potassium caprylate also known as potassium salt of octanic acid and sodium dodecyl benzene sulphonate (SDBS) is used to deliver the broken sulfur molecule to the latex. The pre-vulcanization of the natural latex particles in the natural latex emulsion occurs over a period of time between 9 hours to 2 days depending on the temperature of the latex emulsion which is generally in the range of 20° C. to 30° C. The degree of pre-vulcanization of the natural latex particles is monitored by a chloroform index test and the latex particles progress from a tacky feel (index 1) to a lesser degree of tacky feel (index 3) as pre-vulcanizing sulfur is incorporated within the particle. The post-vulcanization composition may include amorphous or polysulfur, which is insoluble at latex emulsion temperature but is soluble at vulcanization or cure temperature. Other accelerators in the synthetic aqueous latex emulsion includes, but are not limited to zinc diethyldithiocarbamate (ZDEC), sodium diethyldithiocarbamate (SDEC), sodium dibutyldithiocarbamate (SDBC) and diisopropyl xanthogen polysulphide (DXP). Zinc oxide may also be added as an activator.

A typical natural polyisoprene latex emulsion composition is provided in terms of 100 parts by weight of dry rubber (phr). Sulfur crosslinking agent is in the range of 0.6 to 1.8 wt %; ZDEC and/or ZDBC accelerator is in the range of 0.3 to 1.0 wt %; SDBC accelerator is in the range of 0.05 to 0.5 wt %; DXP accelerator is in the range of 0.2 to 0.8 wt %; Reactive zinc oxide activator is in the range of 0 to 0.5 wt %; Potassium caprylate surfactant is in the range of 0.1 to 0.5 wt %; SDBS surfactant is in the range of 0.1-0.35 wt %; Polyoxyethylene cetyl/stearyl ether surfactant is in the range of 0.1 to 0.5 wt %; Winsgtay L or butylated reaction product of p-cresol & dicyclopentadiene anti-oxidant preservative is in the range of 0.3 to 1 wt %; Ammonium hydroxide is in the range of 0 to 0.36 wt %. As indicated earlier, the pre-vulcanization composition of the synthetic polyisoprene latex composition includes soluble sulfur, ZDEC and/or ZDBC accelerator, potassium caprylate surfactant and SDBS surfactant and polyoxyethylene cetyl/stearyl ether surfactant. The post-vulcanization composition includes sulfur especially that which is insoluble, SDBC accelerator, DXP accelerator, ZDEC and/or ZDBC. The pre-vulcanization composition provides the availability of sulfur to natural polyisoprene latex particles in the aqueous natural polyisoprene emulsion and subsequently crosslinks the entire particle of natural polyisoprene during vulcanization cure cycle. The post-vulcanization composition provides the ability to crosslink regions between the particles of natural polyisoprene thereby assuring a high quality substantially uniformly cured polyisoprene product.

BRIEF DESCRIPTION OF THE DRAWINGS

FIG. 1a shows narrow thin former of an aluminum alloy former which is only about 3 mm to 8 mm in width and the shoe cover produced when stretched elongates to capture the shoe elastically securing the shoe cover to the shoe. FIG. 1b shows another view of the aluminum alloy shoe former showing the regions to which the shoe cover former is inserted into a latex bath.

DETAILED DESCRIPTION OF THE INVENTION

Figures 1A, 1B:
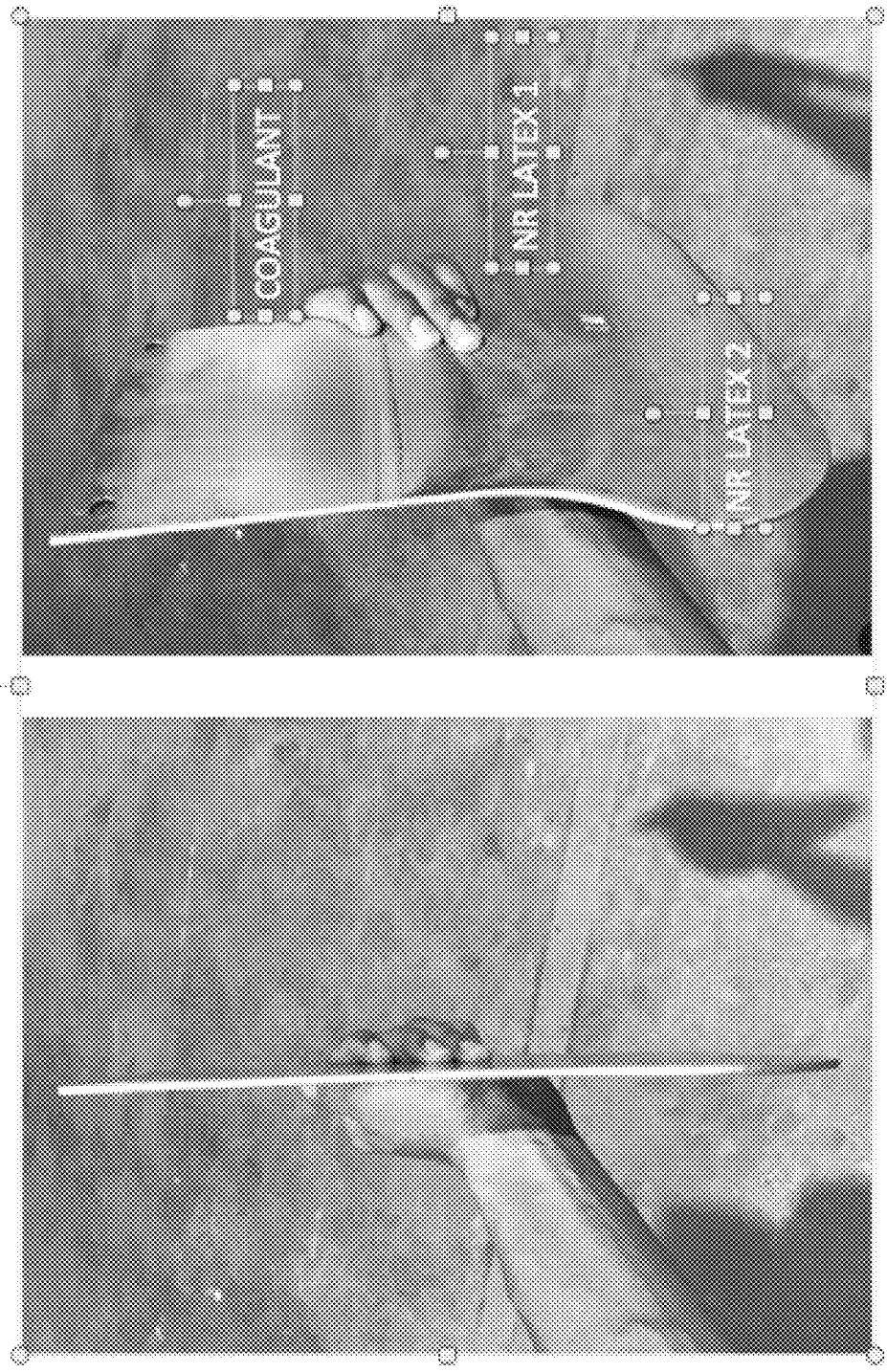
FIG. 1a and FIG. 1b are two views of the former used for producing the shoe cover according to the present invention.

The present invention is predicated on the discovery of soluble sulfur such as $S_8$ rings of sulfur is catalyzed by a zinc complex of dithiocarbamate in combination with potassium caprylate and sodium dodecyl benzene sulphonate (SDBS) surfactant creating pre-vulcanized, natural polyisoprene particles in a latex composition. This latex composition enables the production of latex film articles by dipping coagulant coated or coagulant free formers into the composition. The surfactant package inhibits natural polyisoprene particle agglomeration and flocculation. The latex dipped film has natural polyisoprene particles that become crosslinked and regions between the particles are crosslinked during the vulcanization cure forming both intra-crosslinked and inter-crosslinked bonds. The articles that result comprise a high quality and uniform latex film.

The latex-stabilizing composition is one that keeps the particles of natural polyisoprene separated from each other in the aqueous medium. Since the polyisoprene particles do not touch each other, they are unable to agglomerate and flock. This is important because, once the particles begin to agglomerate, the particles may never be separated due to van der Waals forces. Preferably, the latex-stabilizing composition comprises a surfactant package containing at least one surfactant. An anionic surfactant is preferred, especially one that can be stably maintained for a period of well over one month and up to two months or more. An example of such a surfactant is sodium dodecyl benzene sulphonate (SDBS). Other examples include, but are not limited to, other alkyl aryl sulphonates, alkyl sulphonates (e.g., C14 olefin sulphonate, which is sold under the trade name Calsoft AOS-40 (Pilot Chem. Co., Red Bank, NJ)), olefin sulphonates, and alcohol sulphates (e.g., sodium lauryl sulphate). SDBS or another alkyl aryl sulphonate is preferably present in an amount of about 0.1-0.35 wt %, based on the dry weight of the polyisoprene. SDBS or another alkyl aryl sulphonate can be combined with one or more other surfactants, such as potassium caprylate, polyoxyethylene cetyl/stearyl ether, and the like. For example, SDBS or another alkyl aryl sulphonate can be combined with potassium caprylate, alone or in further combination with polyoxyethylene cetyl/stearyl ether. When SDBS or another alkyl aryl sulphonate is used in combination with one or more other surfactants, preferably each surfactant is present in an amount of about 0.05-1.2 wt %, based on the dry weight of the polyisoprene, and the total amount of the surfactant package is about 0.4-1.2 wt %, based on the dry weight of the polyisoprene. When SDBS or another alkyl aryl sulphonate is used in combination with potassium caprylate and polyoxyethylene cetyl-stearyl ether, preferably the polyoxyethylene cetyl-stearyl ether is present in an amount of about 0.1-0.5 wt %, based on the dry weight of the polyisoprene.

In view of the above, the present invention provides a surfactant-stabilized, pre-vulcanized, natural polyisoprene latex composition having a chloroform index rating of 3.0. The chloroform index test measures the extent of pre-vulcanization of natural latex particles in an aqueous latex emulsion by combining equal volumes of latex and chloroform at room temperature and allowing the mixture to stand for 3 min. Chloroform coagulates the latex, and the resulting consistency is numerically rated. The consistency of the coagulum indicates the degree of pre-vulcanization of the latex. As the latex becomes more pre-vulcanized, the coagulum loses more of its tackiness and becomes more crumbly. A rating of 2.5 indicates that small lumps form, whereas a rating of 3.0 indicates that the lumps are non-tacky, a rating of 3.5 indicates that, not only are the lumps non-tacky, the lumps disintegrate easily, and a rating of 4.0 indicates that dry crumbs form, evidencing a high degree of pre-vulcanization of the natural latex particles. The pre-vulcanization is monitored to assure that the natural latex emulsion is ready for dipping.

The pre-vulcanization composition includes potassium caprylate and SDBS or another alkyl aryl sulphonate surfactants with zinc dithiocarbamate and soluble sulfur. The latex emulsion with surfactants wets the natural polyisoprene particles, catalytic action of zinc dithiocarbamate breaks the ring of soluble $S_8$ molecule forming linear chain of soluble sulfur pre-vulcanizing particles of synthetic polyisoprene. The post-vulcanization composition has sulfur and other accelerators that cause inter-particle cross-linking during vulcanization cure. Such cross-linking results in a more homogeneous latex film having greater strength and elongation properties and crosslink density.

Sulfur is preferably present in the natural polyisoprene latex emulsion in an amount of about 0.8-1.8 wt %, based on the dry weight of polyisoprene. If zinc oxide is used, preferably it is present in an amount of about 0-0.5 wt %, based on the dry weight of polyisoprene, whereas, zinc diethyldithiocarbamate or zinc dibutyldithiocarbamate is used it is preferably present in an amount of about 0.3-1.0 wt % or more preferably about 0.3-0.45 wt %, based on the dry weight of polyisoprene.

Examples of suitable wetting agents include, but are not limited to, salts (e.g., sodium salt or potassium salt) of fatty acids, which are anionic, e.g., sodium stearate, sodium oleate, and potassium caprylate. Potassium caprylate is advantageously used with a salt of a short-chain fatty acid, SDBS and polyoxyethylene cetyl/stearyl ether. Potassium caprylate is used in an amount of 0.1-0.5 wt %, based on the dry weight of polyisoprene.

The penetration of the components of the pre-vulcanizing composition into the polyisoprene particles is a strong function of the polyisoprene particle size and size distribution. Typically, smaller particles have a larger surface area, and the components of the pre-vulcanizing composition penetrate these small particles more rapidly. However, these larger surface areas result in more intra particle regions as those smaller particles tend to pre-vulcanize faster than larger particles. The larger particles may be aggregates of smaller particles and are difficult to pre-vulcanize. Larger particles have a smaller surface area, and the components of the pre-vulcanizing composition penetrate these large particles more slowly. The smaller surface areas result in less intra particle regions. Therefore, there is a delicate balance in selecting the size and size range distribution of the natural polyisoprene particles to produce optimal strength properties that balance pre-vulcanization intra-particle cross-linking with post-vulcanization inter-particle cross-linking. As indicated above, particles in the range of about 0.2-2 micrometers provide optimal results. The penetration of the components of the pre-vulcanizing composition into the natural polyisoprene particles is also a function of the diffusion process itself, which is a linear function of time and an exponential function of temperature, reflecting a thermally activated process. Therefore, increasing the temperature by a few degrees during the pre-vulcanization step increases significantly the pre-vulcanization rate. For example, pre-vulcanization at room temperature requires from about 3-5 days to as much as about 9 days, while pre-vulcanization at an elevated temperature, e.g., about 50-70° C., requires only about 3-7 hours. However faster pre-curing is typically avoided so as to prevent pre-vulcanization taking place only on periphery of large aggregates as that would result in poor ultimate strength properties of the film: this is the case hardening reaction and the use of potassium caprylate has demonstrated that it would facilitate transporting curative agents in to the particles thus accelerating the rate of pre-vulcanization.

Preferably, the post-vulcanization composition comprises sodium dibutyl dithiocarbamate (SDBC), sulfur, a thiuram compound, and/or a xanthogen compound, alone or in further combination with a surfactant. Examples of suitable xanthogens include, but are not limited to, diisopropyl xanthogen polysulphide (DXP), diisopropyl xanthogen, tetraethylthiuram disulfide, and xanthogen sulfide. DXP is a preferred xanthogen. When present, the xanthogen is present in an amount of about 0.05 to 0.5 wt %, based on the dry weight of polyisoprene. An example of a thiuram compound is tetrabenzyl thiuram disulfide. When present, tetrabenzyl thiuram disulfide is present in an amount up to about 0.1 to 0.75 wt %, based on the dry weight of polyisoprene. The post-vulcanization composition is one that causes inter-particle cross-linking upon activation at the elevated temperature (e.g., 110-130° C.). In addition, this post-vulcanization cure also crosslinks the natural polyisoprene particles with permeated sulfur. Such crosslinking results in a more homogeneous latex film having greater strength and elongation properties.

The method comprises adding a latex-stabilizing composition, such as one comprising a surfactant package comprising at least one surfactant, such as at least one surfactant selected from the group consisting of an alkyl aryl sulphonate (e.g., SDBS), an alkyl sulphonate (e.g., olefin sulphonate) and an alcohol sulphate (e.g., sodium lauryl sulphate). If SDBS is present, preferably it is present in an amount of about 0.1-0.35 wt %, based on the dry weight of the polyisoprene. SDBS can be combined with potassium caprylate, alone or with polyoxyethylene cetyl/stearyl ether. A preferred surfactant package comprises SDBS, potassium caprylate, and polyoxyethylene cetyl/stearyl ether. If polyoxyethylene cetyl/stearyl ether is present, preferably it is present in an amount of about 0.1-0.5 wt %, based on the dry weight of the polyisoprene. Upon addition of the latex-stabilizing composition, the emulsion is stirred, e.g., for about 1 day, to keep the polyisoprene particles from touching each other.

Then, the method comprises the steps of adding a pre-vulcanization composition to formulate a natural polyisoprene latex emulsion (a) a zinc dithiocarbamate selected from zinc diethyldithiocarbamate and zinc dibutyldithiocarbamate and combinations thereof; (b) sulfur, preferably with high $S_8$ content and (c) a wetting agent. The wetting agent is preferably a salt of a fatty acid, such as sodium stearate, sodium oleate, or potassium caprylate. The aqueous latex emulsion is stirred for about 3-4 days at about 20-25° C. or about 3-7 hours at about 50-70° C. and periodically examined for permeation of pre-vulcanization agents into the synthetic polyisoprene particles by using the isopropanol index test. The reason why this sequence is adopted is because the polyisoprene latex has an inherent tendency to flock and 'case harden' due to peripheral reaction with sulfur catalyzed by ZDBC or ZDEC. This has to be prevented so that tightly bonded particles do not result. The presence of surfactants and creation of opened out $S_8$ chains of sulfur enables the diffusion of sulfur into the particles.

The method further comprises the steps of adding post-vulcanization composition to the natural polyisoprene latex emulsion with accelerators selected from the group consisting of SDBC, reactive zinc oxide, sodium diethyldithiocarbamate, sodium dibutyldithiocarbamate, thiuram such as tetrabenzyl thiuram disulfide and xanthogen. If reactive zinc oxide is present, preferably it is present in an amount of about 0 to 0.5 wt %, based on the dry weight of polyisoprene. The thiuram can be tetraethylthiuram disulfide, tetrabenzyl thiuram disulfide, which, if present, is preferably present in an amount up to about 0.75 wt %, based on the dry weight of polyisoprene. The xanthogen can be DXP, diisopropyl xanthogen, or xanthogen sulfide. If a xanthogen is present, preferably it is present in an amount of about 0.2 to 0.8 wt %, based on the dry weight of polyisoprene. The composition thus produced is stable for up to about 60 days at 25° C. and can be used in a production line.

Table 1 below shows an example of a composition that exhibits pre-vulcanization behavior.

TABLE 1

| Formulation | Quantity per hundred dry rubber (phr) |
|---|---|
| Natural Latex | 100 |
| SDBS | 0.1-0.3 |
| potassium caprylate | 0.1-0.46 |
| polyoxyethylene cetyl/stearyl ether | 0.1-0.5 |
| sulfur | 0.8-1.8 |
| reactive zinc oxide | 0.05-0.5 |
| ZDEC | 0.4-1.0 |
| SDBC | 0.05-0.5 |
| DXP | 0.2-0.6 |
| Wingstay L antioxidant | 0.5-1.0 |

Thus, the present invention further provides a method of forming a natural polyisoprene latex article. The former can be any suitable former as is known in the art. The present inventive composition is particularly useful for layering onto formers for shoe covers. The method comprises dipping a coagulant coated former in the above-described pre-vulcanized natural polyisoprene aqueous latex emulsion composition with a solid content of 50 to 55% with a viscosity of 18 to 22 second using ford cup #4 to form a thin layer of latex film with a thickness of 200 to 350 microns with individual particles of pre-vulcanized natural polyisoprene touching each other on the surface of the former.

After the first layer of latex film is not runny with a typical thickness of 200 to 350 microns, the bottom portion of the shoe cover is dipped in a denser natural polyisoprene emulsion with a solid content of 50 to 55% and having viscosity of 25 to 30 seconds with ford cup #6 to form a thicker latex layer of about 800 to 1200 microns at the bottom portion of the shoe cover. This enhanced thickness of the latex layer at the bottom prevents tearing as the shoe cover is donned. The method further comprises etching the thicker layer of natural latex with an etching solution of toluene, ethyl alcohol an acetic acid which forms three separate streams due to the immiscibility of toluene with ethyl alcohol and acetic acid. Following this there is an immersion of the entire shoe cover into a polymer solution. The natural rubber film is post-vulcanized by heating the film, e.g., to about 110 to 130° C. for about 8 to 15 min. During this period, the inter-particle regions are cross-linked. The intra-particle regions also undergoes further crosslinking, producing a more homogeneous latex product. Then, the method comprises stripping the latex film from the former.

FIG. 1 shows on two views FIG. 1a and FIG. 1b the former used for dipping the shoe cover. FIG. 1a is edge view of the former while FIG. 1b is the front view of the former. The former is about 20% of the width of the shoe cover when it is worn. The shoe cover has to expand covering the shoe worn by the user.

Figure 2:
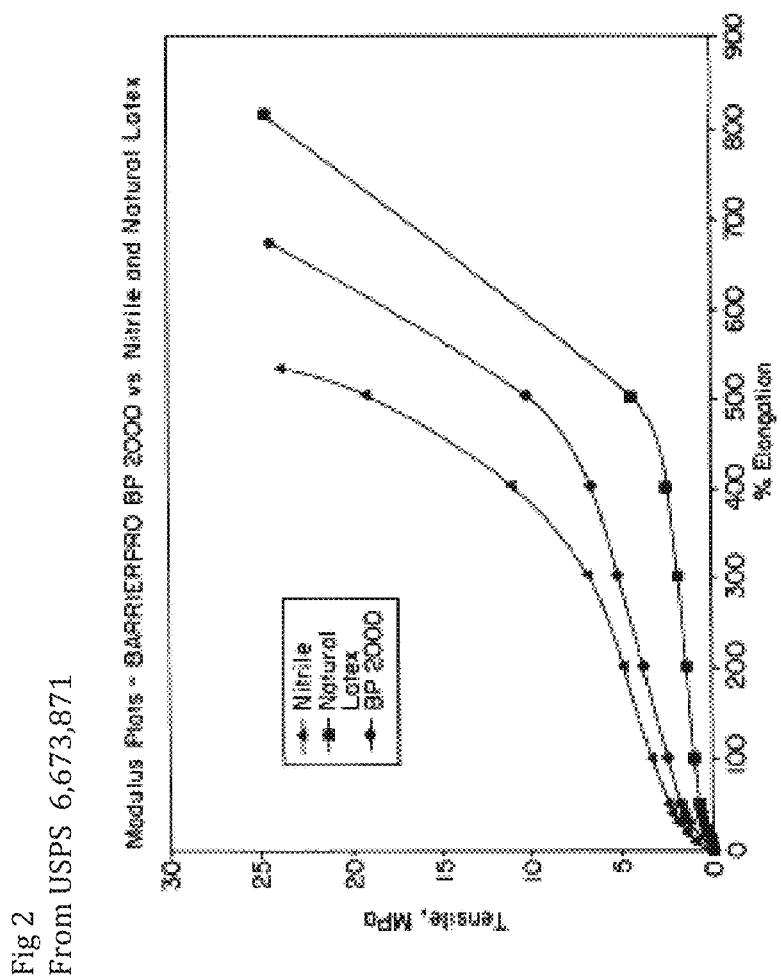
FIG. 2 illustrates the tensile strength versus elongation properties of natural latex rubber as published in U.S. Pat. No. 6,673,871. Natural rubber films show lowest tensile stress and highest elongation. Clearly natural rubber film is most suited for shoe cover since it applies low load on the shoe while gripping the shoe worn by the user.

FIG. 2 shows the load versus elongation for natural latex rubber and nitrile rubber. Clearly, natural latex has the highest elongation before failure with an elongation of 800%. It also applies the lowest load on the shoe worn by the user due to its low modulus.

Figure 3:
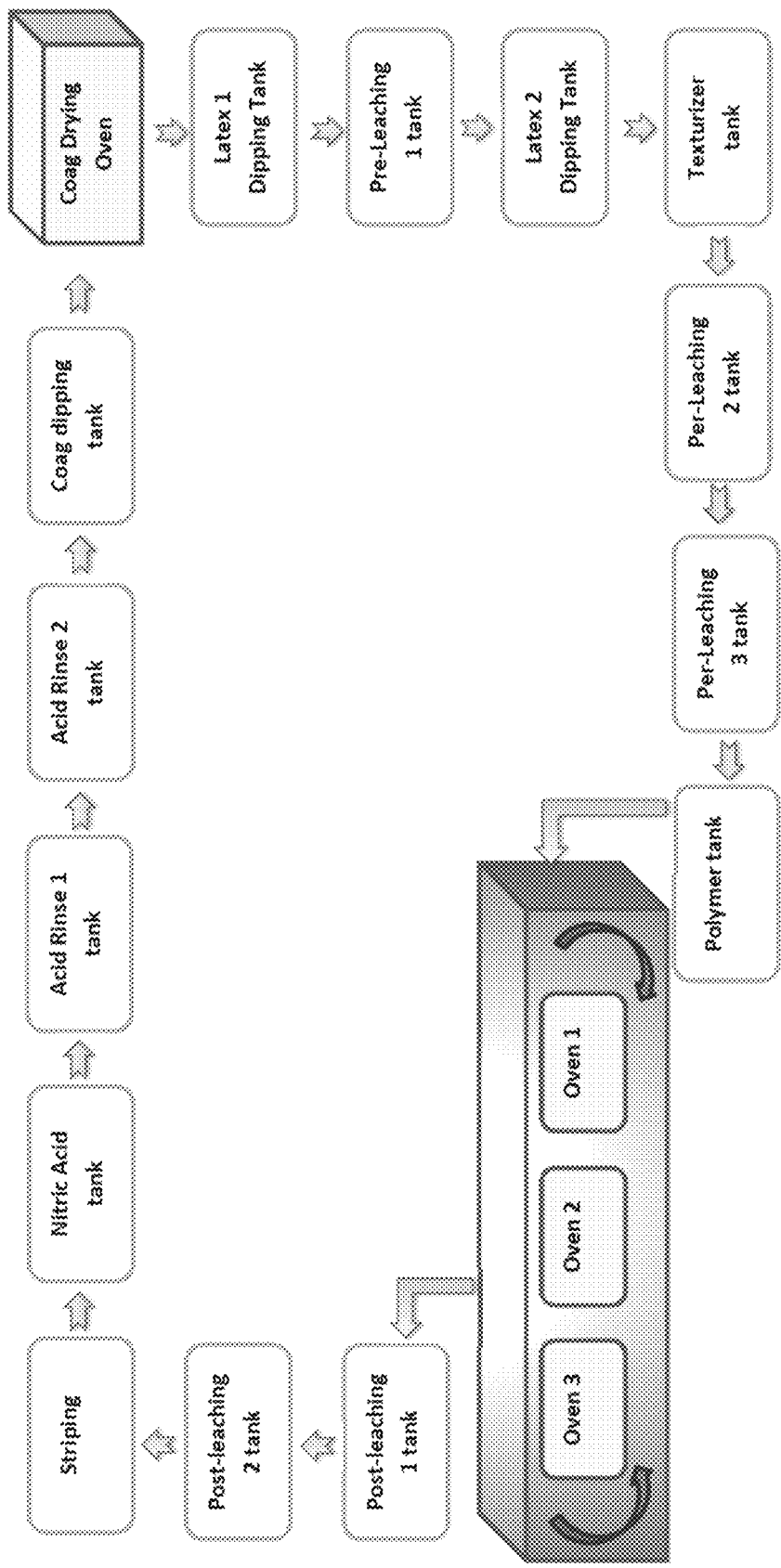
FIG. 3 illustrates the flow chart of the process for producing the shoe cover. The former is first stripped of the previously made shoe cover, cleaned in acid wash and coated with calcium nitrate coagulant and dried in an oven. The coagulant coated former is dipped in natural rubber latex #1 which has reduced amount of sulfur and minimal amount of accelerators. The coagulant coating destabilizes the latex and forms a thin film of natural rubber film on the former. Next the ground contacting bottom portion of the shoe cover is immersed in a higher density natural rubber latex to form a thicker coating at the bottom of the shoe cover. This thicker coating prevents tearing at the bottom when the shoe cover is donned. Next the thicker shoe cover bottom is immersed in a texturizing bath that has nearly linear flow of liquid contained therein. The bath contains 92% by weight of toluene, 4% by weight of acetic acid and 4% by weight of ethyl alcohol and these liquids form separate streams due their immiscibility with toluene. The ethyl alcohol and acetic acid extract water from the natural rubber thicker coating dissolving the natural rubber latex forming grooves. At the same time acetic acid, which is a destabilizer for natural latex emulsion, coagulates and stabilizes the latex coating preventing further dissolution. The stream of toluene does not attack the natural rubber latex coating forming a ridge in the coating. The ridge and the groove direct any water, oil or fat deposits present on the ground to the rear end of the shoe cover as the person wearing the shoe cover walks enhancing friction. Next the bottom of the shoe cover is coated with an acrylic polymer coating enhancing wear properties. Next the shoe cover with multiple coatings is heated on three consecutive ovens maintained at 110° C., 120° C. and 130° C. to cure the natural rubber and polymeric coatings forming an integral easily donning shoe cover.

FIG. 3 illustrates the process flow chart for the manufacture of the shoe cover. The process begins stripping previously made shoe cover. The former is dipped in a nitric acid bath, followed by dip in two acid baths and then dipping in calcium nitrate coagulant bath. The former is then dried in an oven to form dry coagulant coating. It is then dipped in natural rubber latex #1 which has about 50 to 55% total solid content at 20 to 25° C. The viscosity of the latex is about 18 to 22 sec using Ford cup #4. The thickness of latex layer formed is about 200-350 microns. The latex layer coated former is dipped in a pre-leaching tank. Next, the latex coated former is dipped in the second latex tank which has a solid content of 50 to 55% with viscosity of 25-30 sec Ford cup #6, to the depth of creating a ground contacting portion of the shoe cover. The second latex dip produces thicker layer of natural latex layer typically 800-1200 microns. The thicker layer on the bottom of the shoe cover is etched in a texturing bath, which has a slow flowing solution of toluene, ethyl alcohol and acetic acid, which forms separate streams due to the immiscibility of toluene, ethyl alcohol and acetic acid. The steam of ethyl alcohol and acetic acid etches the natural latex second thicker coating creating grooves. Toluene does not attack the latex layer and forms ridges binding the grooves formed by etching action of alcohol and acetic acid. Next, the etched second latex layer is pre leached in in two tanks and then dipped in a polymer coating tank which upon curing will protect the wear of the second latex layer on the bottom of the shoe cover. The coated shoe cover is passed sequentially through three ovens with a temperature of 110° C., 120° C. and 130° C. Due to the low temperature cure of the natural latex layers, the modulus of the latex layer is low and the stretchability of the latex is over 800% and can be stretched to capture the show worn by the user without applying a large amount of load on the shoe.

Figure 4:
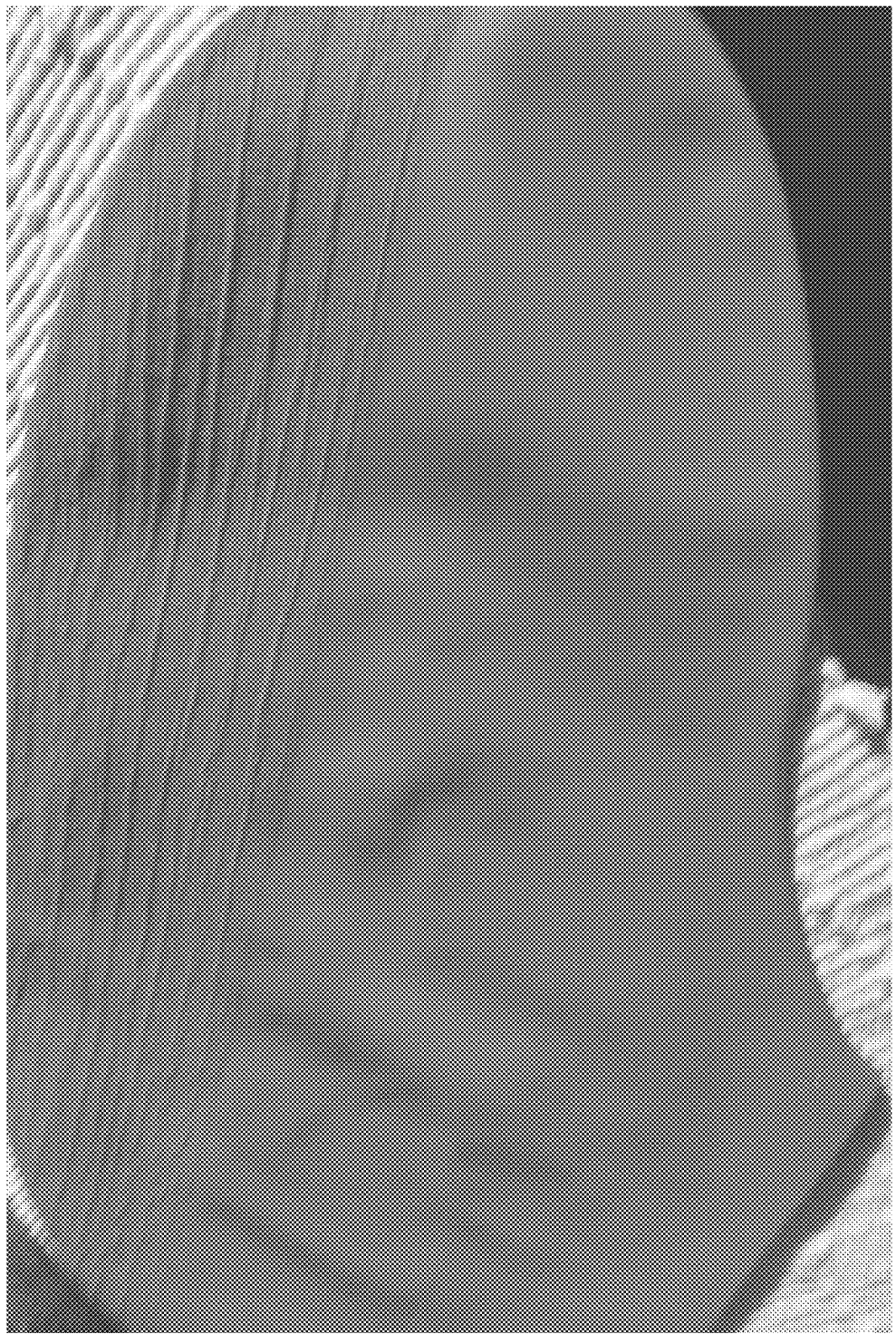
FIG. 4 is a photograph of ridges and grooves formed on the bottom floor contacting surface of the shoe cover.

FIG. 4 is a photograph of half the bottom of the shoe cover. In the top portion of the figure, there are nearly parallel ridges surrounding grooves. The ridges are spaced approximately 5 mm apart with grooves present there between. The half width of the shoe cover with nearly parallel ridges is about 60 mm. The grooves bound by the ridge serve to direct any oil or water to the rear of the shoe as the shoe cover when worn, is lifted to move forward and walk.

Figure 5:
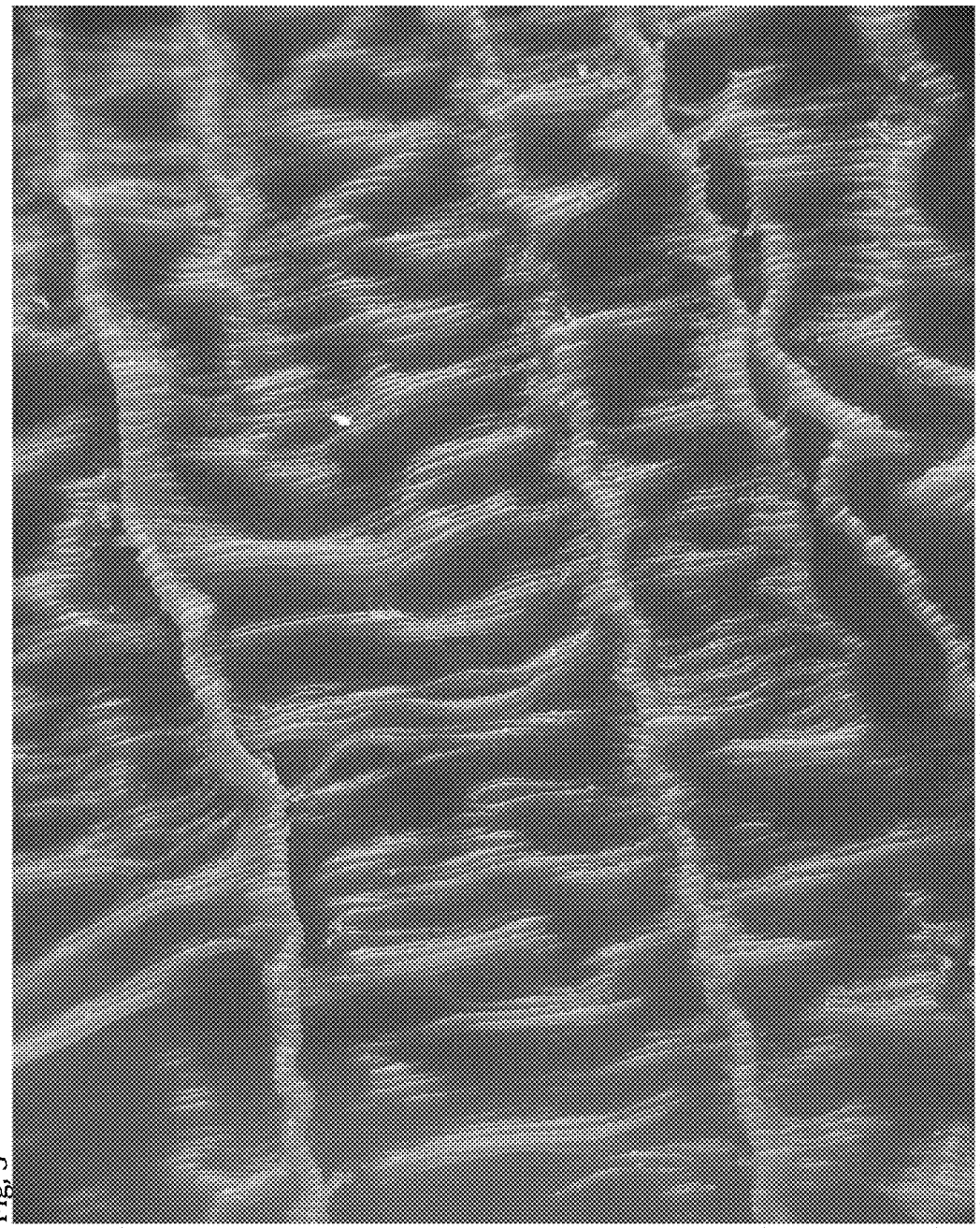
FIG. 5 illustrates the microstructure of the etching of the grooves and the ridges formed, on the floor contacting bottom surface of the shoe cover.

FIG. 5 is an optical microscope photograph at about 40× of the grooves and ridges. The figure shows two ridges with grooves there between. The top of the ridges appears like a line.

All references, including publications, patent applications, and patents, cited herein are hereby incorporated by reference to the same extent as if each reference were individually and specifically indicated to be incorporated by reference and were set forth in its entirety herein.

The use of the terms "a," "an," "the," and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate better the invention and does not pose a limitation on the scope of the invention, unless otherwise claimed. No language in the specification should be construed as indicating any non-claimed element as essential to the practice of the invention.

What is claimed is:

1. A natural polyisoprene latex shoe cover article comprising:
    a. natural polyisoprene particles that are pre-vulcanized by the addition of soluble sulfur catalytically broken to chains of sulfur and incorporated into natural latex particles by use of a surfactant;
    b. said natural polyisoprene forming a latex bath applied to a coagulant coated shoe cover former thereby forming a first natural latex layer;
    c. the first latex layer coated former, dipped in a thicker higher viscosity natural latex, which results in and forms a second latex layer only on the bottom ground contacting portion of the shoe cover article, in which the second latex layer is relatively thicker than the first latex layer in both viscosity and dimensionally;
    d. the second latex layer, which is etched in a slow moving parallel flowing laminar flow of non-polar solvent and polar solvents, in which said polar and non-polar solvents include toluene, ethyl alcohol, and acetic acid which collectively serve to form separate streams due to immiscibility and thereby coagulate the relatively thicker second latex layer, such application of toluene, ethyl alcohol, and acetic acid results in and forms the second latex layer to have parallel and etched ridges and grooves as the non-polar solvent does not attack natural latex coating;
    e. the first latex layer coated former with etched second natural latex layer over first latex natural layer is dipped in a polymer solution and passed through three ovens set at 110° C., 120° C. and 130° C. curing the latex layers and a polymeric wear resistant coating; and
    wherein the etched grooves at the second latex layer from at least the application of acetic acid includes the ridges in the bottom of the latex shoe cover article and enables directing any oil or water to the rear of the shoe cover providing enhanced friction and preventing the slip of the shoe cover, and wherein the latex shoe cover article stretches up to 800% to enable the shoe cover article to stretch over a user's shoe; and
    whereby said pre-vulcanized natural polyisoprene particles have a chloroform index rating of 3.0, and wherein the natural polyisoprene latex shoe cover article comprises said surfactant.

2. The natural polyisoprene latex article of claim 1, wherein said first natural latex layer is 200 to 350 microns thick.

3. The natural polyisoprene latex article of claim 1, wherein said second natural latex layer is 800 to 1200 microns thick.

4. The natural polyisoprene latex article of claim 1, wherein said surfactant is selected from the group consisting of potassium caprylate, polyoxyethylene cetyl/stearyl ether, alkyl aryl sulphonate, alkyl sulphonate, olefin sulphonate, an alcohol sulphate and combinations thereof.

5. The natural polyisoprene latex article of claim 1, wherein said surfactant is selected from the group consisting of potassium caprylate, sodium dodecyl benzene sulphonate and mixtures thereof.

6. The natural polyisoprene latex article of claim 1, wherein the latex bath has a solids content of 50 to 55% and the thicker higher viscosity natural latex has a solids content of 50 to 55%.

7. The natural polyisoprene latex article of claim 1, wherein said polar solvent is acetic acid which serves to coagulate the thick latex layer applied.

8. A method for producing a natural polyisoprene latex shoe cover article comprising:
    a. providing a pre-vulcanization composition comprising pre-vulcanizing natural polyisoprene particles by the addition of soluble sulfur catalytically broken to chains of sulfur and incorporated into natural latex particles by use of one or more surfactants;

b. applying a coagulant coated shoe cover former in natural polyisoprene latex bath applied thereby forming a first natural latex layer;

c. dipping the first latex layer coated former in a thicker higher viscosity natural latex forming a second latex layer only on the bottom ground contacting portion of the shoe cover article, wherein the second latex layer is relatively thicker than the first latex layer in both viscosity and dimensionally;

d. etching the second latex layer in a slow moving parallel flowing laminar flow of non-polar solvent and polar solvents, in which said polar and non-polar solvents include toluene, ethyl alcohol, and acetic acid which collectively serve to form discrete parallel streams due to immiscibility and thereby coagulate the relatively thicker second latex layer, such application of toluene, ethyl alcohol, and acetic acid forming the second latex layer to have parallel and etched ridges and grooves and as the non-polar solvent does not attack natural latex coating;

e. dipping the former with etched second natural latex layer over first latex natural layer in a polymer solution;

f. passing the polymer solution coated former with the first and second latex layers through three ovens set at 110° C., 120° C. and 130° C. curing the latex layers and a polymeric wear resistant coating;

wherein the etched grooves at the second latex layer from at least the application of acetic acid includes the ridges in the bottom of the latex shoe cover article and enables directing any oil or water to the rear of the shoe cover providing enhanced friction and preventing the slip of the shoe cover article, wherein the latex shoe cover article stretches up to 800% to enable the shoe cover article to stretch over a user's shoe; and whereby said pre-vulcanized natural polyisoprene particles have a chloroform index rating of 3.0, and wherein the natural polyisoprene latex shoe cover article comprises said one or more surfactants.

9. A method for producing a natural polyisoprene latex shoe cover article according to claim 8, wherein said soluble sulfur comprises Ss sulfur rings.

10. A method for producing a natural polyisoprene latex shoe cover article according to claim 8, wherein said pre-vulcanization composition comprises one or more accelerators selected from the group consisting of zinc diethyldithiocarbamate (ZDEC) or zinc dibutyldithiocabamate (ZDBC) and combinations thereof.

11. A method for producing a natural polyisoprene latex shoe cover article according to claim 8, wherein said one or more surfactants comprises potassium caprylate, polyoxyethylene cetyl/stearyl ether, alkyl aryl sulphonate, alkyl sulphonate, olefin sulphonate, an alcohol sulphate or and combinations thereof.

12. A method for producing a natural polyisoprene latex shoe cover article according to claim 11, wherein said alkyl aryl sulphonate is sodium dodecylbenzenesulphonate (SDBS).

13. A method for producing a natural polyisoprene latex shoe cover article according to claim 11, wherein said alkyl sulphonate is olefin sulphonate.

14. A method for producing a natural polyisoprene latex shoe cover article according to claim 11, wherein said alcohol sulphate is sodium lauryl sulphate.

* * * * *